(12) United States Patent
Mambakkam et al.

(10) Patent No.: US 7,508,659 B2
(45) Date of Patent: Mar. 24, 2009

(54) FLASH MEDIA READING DEVICES WITH INTEGRATED STORAGE COMPARTMENTS

(75) Inventors: Sreenath Mambakkam, San Jose, CA (US); Arockiyaswamy Venkidu, Menlo Park, CA (US); Larry Lawson Jones, Stockton, CA (US)

(73) Assignee: MCM Portfolio LLC, Cupertino, CA (US)

( * ) Notice: Subject to any disclaimer, the term of this patent is extended or adjusted under 35 U.S.C. 154(b) by 0 days.

(21) Appl. No.: 11/059,971

(22) Filed: Feb. 16, 2005

(65) Prior Publication Data

US 2005/0168931 A1    Aug. 4, 2005

Related U.S. Application Data

(63) Continuation-in-part of application No. 10/065,763, filed on Nov. 15, 2002, now Pat. No. 6,859,361.

(51) Int. Cl.
*G06F 1/16* (2006.01)
(52) U.S. Cl. .................... 361/684; 439/638; 349/65
(58) Field of Classification Search .................. 361/692, 361/752, 679–687, 724–727; 348/231.99; 439/638; 312/223.1–223.2; 349/60, 65
See application file for complete search history.

(56) References Cited

U.S. PATENT DOCUMENTS 5,687,592 A * 11/1997 Penniman et al. ............... 70/14
6,173,405 B1    1/2001 Nagel
6,190,182 B1    2/2001 Liebenow et al.
6,246,578 B1    6/2001 Wei et al.
6,285,555 B1    9/2001 O'Neal et al.
6,456,491 B1    9/2002 Flannery et al.
6,477,604 B1   11/2002 Chen
6,522,552 B1    2/2003 Lee
6,523,079 B2    2/2003 Kikinis et al.
6,532,152 B1 *  3/2003 White et al. ................ 361/692
6,688,521 B2 *  2/2004 Cheng ........................ 235/451
6,859,361 B1 *  2/2005 Mambakkam et al. ...... 361/684
2006/0050155 A1 * 3/2006 Ing et al. ............... 348/231.99

* cited by examiner

*Primary Examiner*—Hung V Duong
(74) *Attorney, Agent, or Firm*—Greenberg Traurig, LLP

(57) ABSTRACT

A memory card interface apparatus including a bay to receive a memory card for accessing data stored on the card, and a separate storage cavity configured to store a memory card. In one embodiment, the cavity includes an aperture providing access to remove a card from the storage cavity. In one embodiment, the cavity includes an element protruding out a side of the storage cavity to retain a card within the storage cavity. In one embodiment, the apparatus includes at least a second separate storage cavity configured to store a memory card. In one embodiment, the apparatus includes at least a third separate storage cavity configured to store a memory card. In one embodiment, the apparatus comprises a tower configuration. In one embodiment, the apparatus is configured to attach to a separate add-on configuration, the separate add-on configuration providing storage for additional memory cards. In one embodiment, the apparatus includes at least a third separate storage area configured to store a memory card.

19 Claims, 6 Drawing Sheets

FLASH MEDIA READING DEVICES WITH INTEGRATED STORAGE COMPARTMENTS

CROSS-REFERENCE TO RELATED APPLICATIONS

This application is a continuation-in-part of and hereby claims the benefit of U.S. patent application Ser. No. 10/065,763 filed on Nov. 15, 2002, now U.S. Pat. No. 6,859,361 entitled Flash Media Reading Devices with Integrated Storage Compartments.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field

The present invention relates generally to flash memory readers, and more specifically to an improved configuration of the same.

2. Background

Flash medium reading devices have recently increased in popularity, in part, due to the recent proliferation of digital cameras. For example, in a recent year, more digital cameras were sold than traditional film cameras. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

Digital cameras typically capture images electronically and ultimately store the images as bits (ones and zeros) on a solid-state memory. Flash memory is the most common storage for digital cameras.

Flash medium reading devices are often small and compact to allow for easy portability in conjunction with notebook computers, PDAs, etc. However, such devices must have a certain minimal size to make them reasonably easy to handle and easy for the user to handle, use, insert and remove cards, etc. As a result, the flash medium card enclosure may contain a certain amount of empty space. It is also the case that a traveler on a long journey may need to take multiple flash medium cards of various types, for which he then must carry a sufficient number of protective cases.

What is clearly needed is a flash card reading device that not only can read a card but also uses the extra space often included in flash card readers to provide secure, clean storage for additional cards that are not currently in use.

SUMMARY OF INVENTION

An embodiment of the present invention provides a memory card interface apparatus including a bay to receive a memory card for accessing data stored on the card, and a separate storage cavity configured to store a memory card. In one embodiment, the cavity includes an aperture providing access to remove a card from the storage cavity. In one embodiment, the cavity includes an element protruding out a side of the storage cavity to retain a card within the storage cavity. In one embodiment, the apparatus includes at least a second separate storage cavity configured to store a memory card. In one embodiment, the apparatus includes at least a third separate storage cavity configured to store a memory card. In one embodiment, the apparatus comprises a tower configuration. In one embodiment, the apparatus is configured to attach to a separate add-on configuration, the separate add-on configuration providing storage for additional memory cards. Other features and advantages of embodiments of the present invention will be apparent from the accompanying drawings, and from the detailed description that follows below.

BRIEF DESCRIPTION OF THE DRAWINGS

The invention may be best understood by referring to the following description and accompanying drawings that are used to illustrate embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Figure 1:
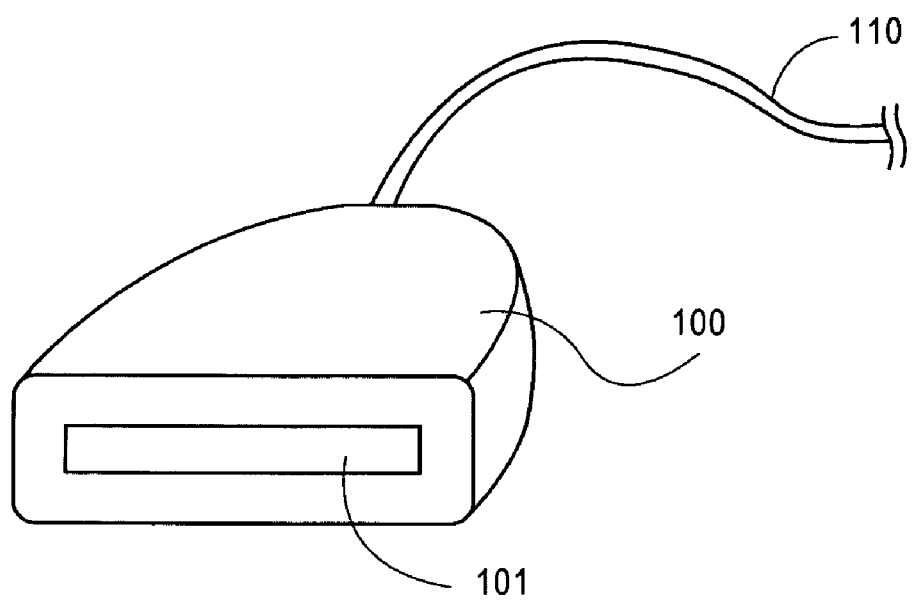
FIG. 1 illustrates one of the basic types of the prior art of card readers.

Flash medium card reading devices have essentially two design types. FIG. 1 shows one of the basic types of the prior art of card readers. Device 100 is essentially flat and somewhat triangular in shape, with a connector, such as a USB connector, or cable 110 coming out of its tail and a slot 101 on the opposite side of the device. Typically its thickness is that of about three to five flash cards, but the interconnect electronic components usually occupy only the thickness of about two cards. The unit is typically made of two plastic shells that snap together, thus enclosing the electronic components of the unit.

Figure 2:
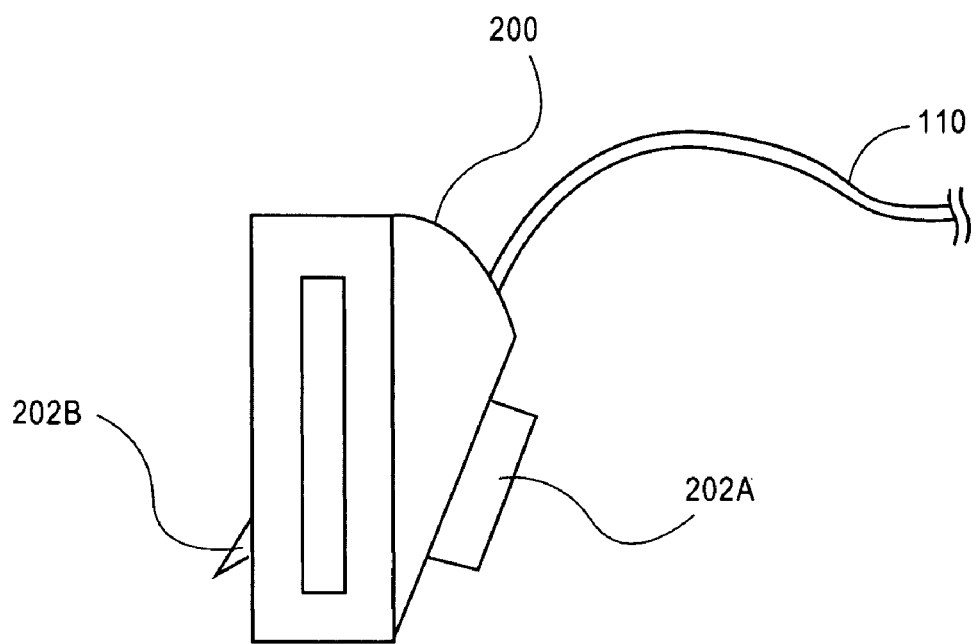
FIG. 2 illustrates an alternative prior art of card readers.

FIG. 2 shows the other basic type of the prior art of card readers, which has the shape of a small tower 200. It has a slot 201 at the front, two legs 202a and 202b, and a cable 110 extending out from the end.

Figure 3:
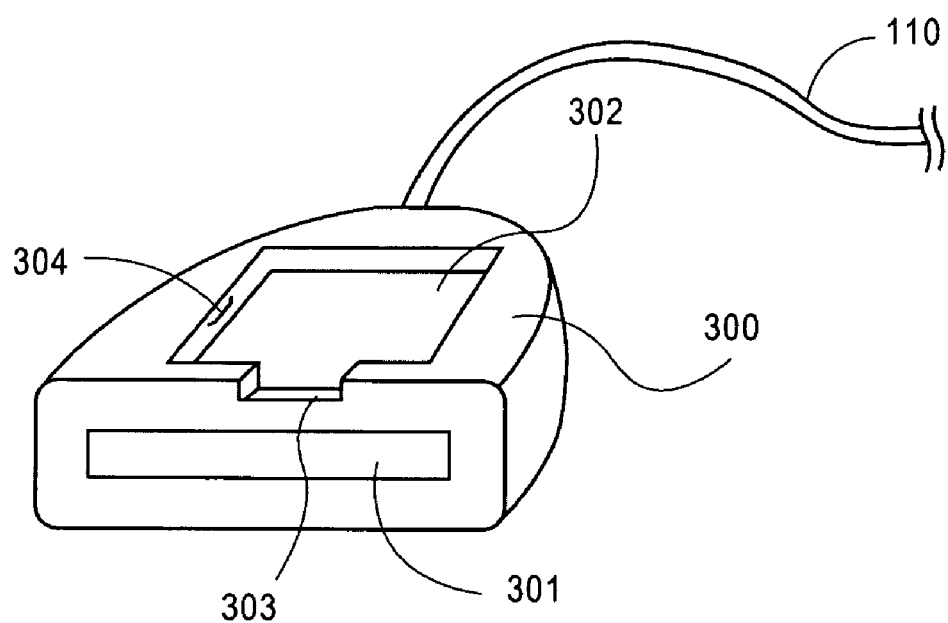
FIG. 3 illustrates the present invention as implemented on a flash card reading device, in accordance with one embodiment.

FIG. 3 illustrates one embodiment of the present invention as implemented on a flash card reading device shown in FIG. 1. Card reader 300 has a storage cavity 302 (also referred to herein as a storage area) added to the top half of the device shell. In one embodiment, the cavity includes two additional elements. The first such element is cutout 303 (also referred to herein as an aperture) to extract the flash card from the cavity. The cutout 303 may have any of various shapes and forms. One such simple example form is an opening that allows the user to insert a finger, fingernail, or tool to grab and extract the card.

The second element 304, in one embodiment, is a spring or bump (the bump may be designed and fabricated of a material such that it acts as if it is spring loaded) to retain the flash card when it is inserted in storage cavity 302. Both these elements 303 and 304 may have any of many various and diverse forms, using buttons, levers, springs, etc., either solely or in combinations, without departing from the spirit of their respective functions, which are, for element 304, to retain the card, and, for cutout 303, to extract the card.

Figure 4A:
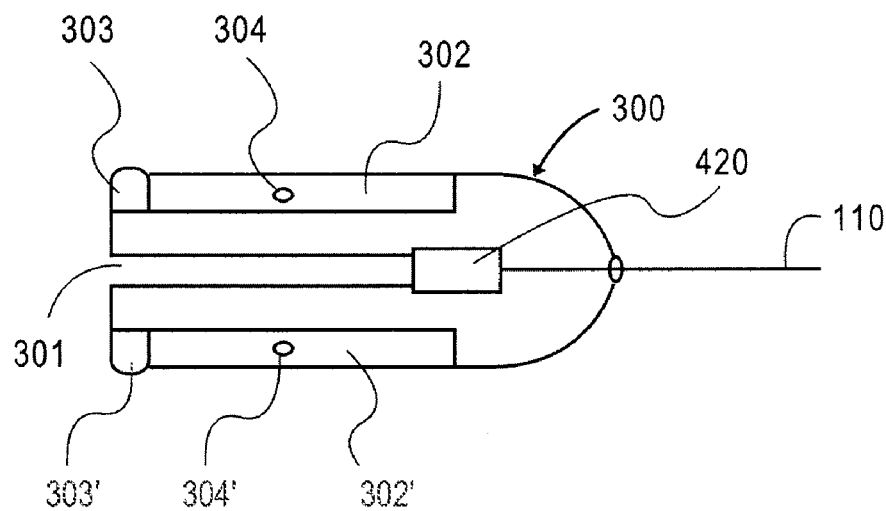
FIGS. 4*a-b* illustrate the present invention as implemented on a flash card reading device in a tower configuration, in accordance with one embodiment.
Figure 4B:
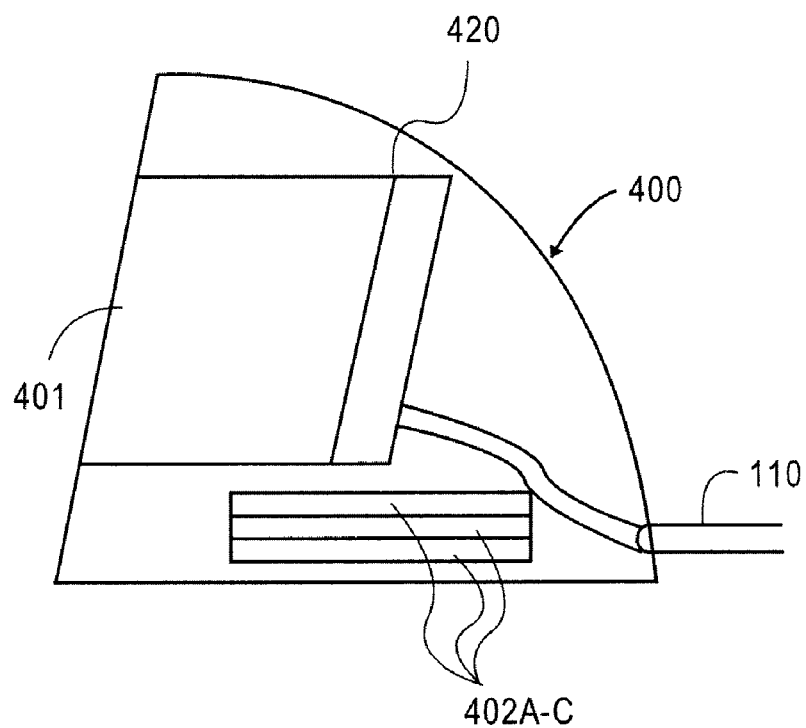

FIGS. 4a-b illustrate two embodiments of having a storage cavity in tower 400, similar to the mini-tower device shown in FIG. 2. FIG. 4a illustrates a top cross section of one embodiment; whereas FIG. 4b illustrates a mini-tower side cross section of an alternative embodiment.

As illustrated in the embodiment shown in FIG. 4a, two cavities 302 and 302' are included in the tower, each with its own retainer mechanism 304 and 304', respectively, and release mechanism 303 and 303', respectively. Also shown in FIG. 4a is slot 301 and, in simplified form, electronic components 420, which connect to cable 110. As previously discussed, a USB connector may alternatively be used to connect directly to the device.

FIG. 4b is a side view of another tower 400 with slot 401 and electronics 420; however, in this example, in the feet 202 are three storage bays/cavities, 402a, 402b, and 402c, for three cards. In one embodiment, the bays may use sliding trays to insert and extract the flash cards.

In alternative embodiments, for example, a pop-out mechanism may be used to insert and remove cards. In such a case, the card is inserted at the side and held in place by a retainer (not shown) such as spring, bump, or other mechanism. In one embodiment, at the far end is a button-type mechanism (not shown) similar to the push-button mechanism, similar to a ballpoint pen design. In one embodiment, the button mechanism has two stable positions, one recessed and one released. Thus, when the user inserts the card, the button shifts to the recessed position. When the button is pushed further, the card pops out sufficiently that the user can grasp it and pull it out.

As noted above, other functionally equivalent mechanisms, such as buttons, levers, springs, etc. may be used to push out a selected card from the opposite side so it can be conveniently extracted, without departing from the scope of the invention.

The convenient storage provided by the present application allows the user to reduce clutter, particularly when traveling, as well as in many other applications. In alternative embodiments, the number of additional storage slots may be further increased by use of an add-on case that may be snapped onto an existing device or put under the device as a base, providing storage for not only three or four, but ten, twenty, or an even greater number of cards.

Such add-on storage cases may employ the push-in, push-out mechanisms described above, similar to that of a ballpoint pen, to allow easy access to selected cards. Alternatively, release buttons may be on alternate sides, left and right, of the slots, thus allowing additional space between the buttons for the user's fingers to push selected buttons.

Figure 5:
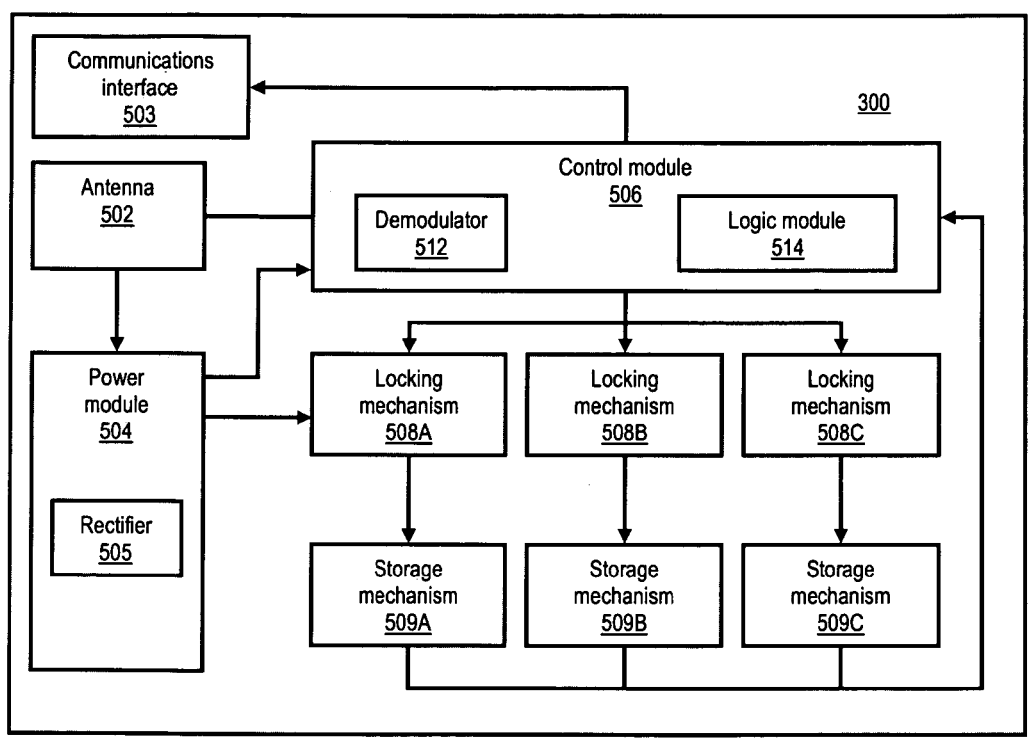
FIG. 5 illustrates the present invention as implemented on a flash card reading device with a locking mechanism in accordance with one embodiment.

FIG. 5 illustrates the present invention as implemented on a card reading device with a locking mechanism in accordance with one embodiment. In FIG. 5, reader 300 generally includes antenna 502, power module 504, control module 506, locking mechanisms 508A-C and storage mechanisms 509A-C.

Antenna 502 may be externally or internally mounted. In certain embodiments, antenna 502 may receive a signal from a remote device to lock or unlock a storage mechanism (e.g. 509A-C) via a locking mechanism (e.g. 508A-C), as will be described in more detail below. In other embodiments, antenna 502 may transmit a signal to a remote device indicating the status of a card coupled to the reader 300 (e.g. a memory card in storage mechanism 508A), as will be described in more detail below. In certain embodiments, the signal may be a radio frequency signal, an infrared signal, an optical signal or the like. In certain embodiments, the signal is transmitted in accordance with standards, such as protocols based the Institute of Electrical and Electronics Engineers (IEEE) 802.11 (e.g. 802.11a, 802.11b, 802.11e or 802.11g), IEEE 802.16 (or WiFi), Wireless Universal Serial Bus (USB) or Bluetooth, or the like.

In certain embodiments, a received signal may include both a data signal and a power signal. In those embodiments, the signal may be transmitted from antenna 502 to power module 504. Power module 504 may then use rectifier 505 to rectify the signal and power the remaining components in reader 300. In other embodiments, power module 504 may be, or be connected to, another source of power, e.g. a battery or a house power outlet. Power module 504 provides power to control module 506. In certain embodiments, power module 504 also provides power to locking mechanism 508A-C.

In one embodiment, a signal received at antenna 502 is transmitted to control module 506. Control module 506 may include a demodulator to demodulate the signal. The modulated or demodulated signal may then be transmitted to logic module 514. Logic module 514 may be based on digital or analog circuits. In certain embodiments, a clock signal for the logic module is derived from the signal received at antenna 502. In other embodiments, the clock signal may be provided by a separate oscillator, e.g. a crystal oscillator. Logic module 514 determines whether to send a lock or unlock command to one or more locking mechanism (e.g. 508A-C).

Locking mechanisms 508A-C may be an electrical, mechanical, electro-mechanical, magnetic or electromagnetic locking mechanism, or a combination thereof. Although the embodiment in FIG. 5 shows three locking mechanisms, it shall be appreciated that reader 300 may include less than or more than three locking mechanisms. In addition, although the embodiment in FIG. 5 shows one locking mechanism per storage mechanism, it shall be appreciated that a locking mechanism in certain embodiments may be coupled to and control more than one storage mechanism.

Storage mechanisms 509A-C may each receive one or more memory card, as previously described. Storage mechanism 509A-C each may include elements 303 and/or 304, also as previously described. In certain embodiments, a locking mechanism may lock or unlock a storage mechanism, but may not control a retaining or ejection mechanism in the storage mechanism. For example, in one embodiment, locking mechanism 508A may lock or unlock storage mechanism 509A, but may not control a button to eject a card stored in storage mechanism 508A. In such an embodiment, once unlocked, a card stored in storage mechanism 508A may still need to be manually ejected to remove the card. In another embodiment, locking mechanism 508A may lock or unlock storage mechanism 509A and also control the retaining or ejection mechanism in the storage mechanism. For example, sending a signal to unlock a card may both unlock locking mechanism 508A and eject the card from storage mechanism 509A.

In certain embodiments, a signal received at antenna 502 may lock one storage mechanism via one locking mechanism and unlock a second storage mechanism via a second locking mechanism. For example, in one embodiment, reader 300 may transmit a signal that a card in storage mechanism 509A is full. In response to the transmission, antenna 502 may receive a signal with instructions to unlock storage mechanism 509A and lock storage mechanism 509B. In response to the received signal, control module 506 may send a signal to locking mechanism 508A to unlock storage mechanism 509A, and in some embodiments eject the card in storage mechanism 509A. Control module 506 may (simultaneously or subsequently) send a signal to locking mechanism 508B to lock storage mechanism 509B. In certain embodiments, control module 506 may send a signal to load another card in a storage mechanism before sending a signal to lock the storage mechanism.

In certain embodiments, reader 300 may also include a communications interface 503. Communications interface 503 may include a network interface (e.g. an Ethernet card or a modem). In certain embodiments, communications interface 503 transmits signals from reader 300 and antenna 503 receives signals from a remote device. In other embodiments, antenna 503 transmits signals and communications interface 503 receives signals. One or more of these signals may include the status of a card coupled to the reader. For example, the status may indicate that the card is full, that the card has completed a download or upload or that a read or write to the card is complete.

Figure 6:
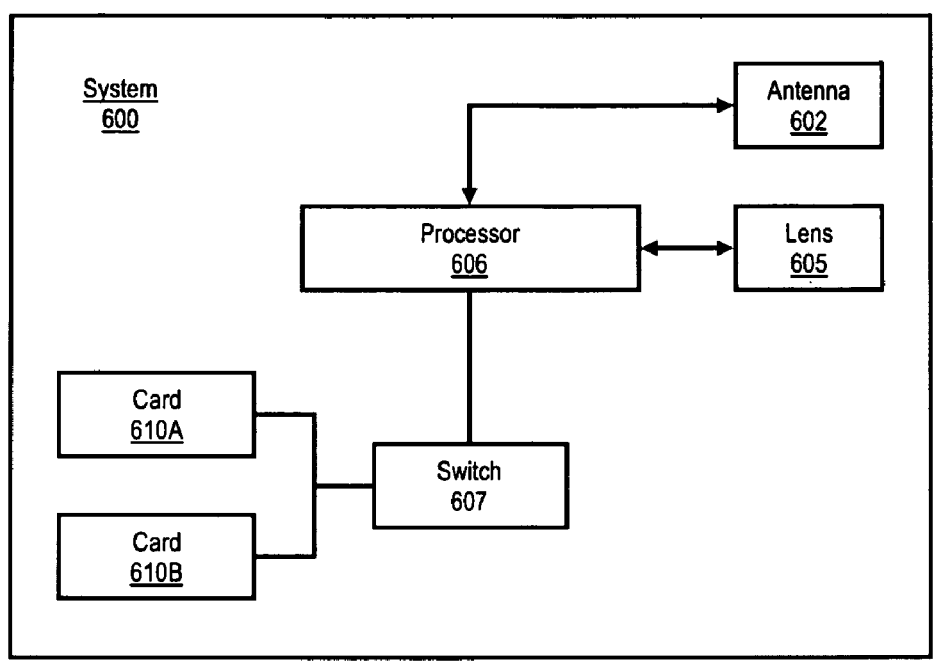
FIG. 6 illustrates a system for transmitting a status of a memory card in accordance with one embodiment.

FIG. 6 illustrates a system for transmitting a status of a memory card in accordance with one embodiment. In FIG. 6, system 600 includes an antenna 602, lens 605 and a processor 606. In one embodiment, system 600 is a video surveillance camera. In other embodiments, system 600 may be another kind of motion video camera or a still video camera.

Antenna 602 may be externally or internally mounted. Antenna 602 may receive and/or transmit signals to a remote device. For example, in certain embodiments, antenna 602 may transmit a notification that a card (e.g. 610A or 610B) is full or receive a signal to switch from storing data on one card to another card (e.g. from card 610A to card 610B). In certain embodiments, the signal is a radio frequency signal, an infrared signal, an optical signal, or the like. In certain embodiments, the signal is transmitted in accordance with standards, such as protocols based the Institute of Electrical and Electronics Engineers (IEEE) 802.11 (e.g. 802.11a, 802.11b, 802.11e or 802.11g), IEEE 802.16 (or WiFi), Wireless Universal Serial Bus (USB) or Bluetooth, or the like.

Lens 605 captures data to store in cards 610A or 610B. For example, lens 605 may capture video images or still images to be processed by processor 606 and stored on card 610A or 610B.

In certain embodiments, processor 606 determines when a card (e.g. 610A) reaches a certain capacity (e.g. full or 90% full). In one embodiment, if processor 606 determines that a card reaches a certain capacity (e.g. full), process 606 may automatically switch from storing data on the current card, e.g. 610A, to storing data on another card, e.g. card 610B. Processor 606 may use software, hardware, or a combination thereof, to switch cards. For example, in one embodiment, cards 610A and 610B are coupled to processor 606 via a bus (not shown). When card 610A is full, processor 606 may switch the card being written by programmatically redirecting the transmissions from card 610A to card 610B. In another embodiment, a hardware switch (e.g. transistor, diode or mechanical switch) may determine which card is electrically coupled to the processor 606. When a card is full, the switch may decouple the processor from the full card and couple the processor to an empty card. In certain embodiments, the switch may be controlled by a processor other than processor 606.

In yet another embodiment, when processor 606 determines that a card is full, processor 606 may transmit a signal via antenna 602, or another communications interface (not shown), to indicate the status of the card. Processor 606 may stop capturing data until another card is manually inserted into the system, or until processor 606 receives a command (manually or electronically) to switch to another card.

Figure 7:
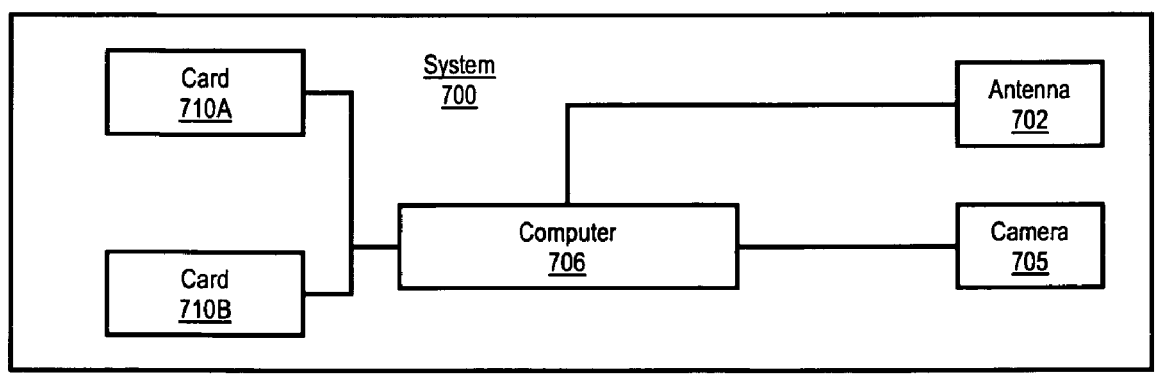
FIG. 7 illustrates another system for transmitting a status of a memory card in accordance with one embodiment.

FIG. 7 illustrates another system for transmitting a status of a memory card in accordance with one embodiment. Like system 600, system 700 also captures data (e.g. video). However, in system 700, the video capture device is not a lens but rather a video camera, still camera or video capture card. Therefore, in one embodiment system 700 may include system 600.

In one embodiment system 700 is a surveillance system that includes a computer 706 coupled to the camera 705. Camera 705 may provide a video feed to camera 706 which stores the data on card 710A and 710B. In one embodiment, card 710A and 710B may be stored on a card reader (not shown), such as reader 300, coupled to computer 706. In certain embodiments, when computer 706 determines that a card, e.g. 710A, is full, computer 706 may automatically switch to writing to another card, e.g. 710B. In one embodiment, automatically switching may include ejecting the full card and automatically loading another card. In other embodiments, when computer 706 determines that a card is full, computer 706 may cease recording, send a notification (e.g. via antenna 702) and wait for a manual switch to another card before recording continues.

In certain embodiments, cards 710A and 710B may be housed in camera 705. In those embodiments, camera 705 may store data on card 710A and notify computer 706 when the card is full. Computer 706 may have logic determining when to send a command to camera 705 to switch to another card, e.g. 710B. For example, computer 706 may be programmed to send certain commands at certain times. For example, computer 706 may be programmed to instruct camera 705 to automatically switch to another card during non-business hours, but may be programmed to instruct camera 705 to wait for manual intervention during business hours. In other embodiments, computer 706 may include a user interface to receive instructions from a user. In certain embodiments, these instructions may be received via antenna 702 or via a network (not shown).

In yet other embodiments, computer 706 may read data stored on a card housed in camera 705. When the read is complete, camera 705 may send a signal to computer 706 via an antenna (not shown) coupled to camera 705. In response to receiving the signal, the computer may begin reading from another card housed in the camera. In other embodiments, the card may be housed in reader 300 or tower 400 rather than camera 705.

In certain embodiments, when the read is complete, the read card may be ejected from the camera, reader or tower. In certain embodiments, the card may be ejected in response to a command from computer 706 or from a processor in the camera, reader or tower.

In certain embodiments, before computer 706 begins reading from a second card housed in a camera, reader or tower, the first card is unloaded and the second card is loaded in its place. In certain embodiments, this loading and unloading may be via mechanical devices (e.g. gears), electrical devices (e.g. electrical switches), software devices, or a combination thereof.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

The invention claimed is:

1. A memory card reader, comprising:
   a housing having a slot to receive a first memory card;
   an electronic component to read the first memory card;
   a connector to connect the memory card reader to a computer system;
   a memory card storage mechanism comprising a storage cavity to store a separate second memory card;
   means for ejecting the second memory card from the storage cavity; and
   means for locking the memory card storage mechanism.

2. The memory card reader of claim 1, wherein means for locking includes means for electrically, mechanically, electro-mechanically, magnetically or electro-magnetically locking the storage mechanism.

3. The memory card reader of claim 1, further comprising means for receiving a signal to control the means for locking.

4. The memory card reader of claim 3, wherein the signal is from a remote device.

5. The memory card reader of claim 3, wherein the signal is a wireless signal.

6. The memory card reader of claim 1, further comprising a wireless transmitter to transmit a status of the first memory card, wherein the wireless transmitter is to transmit in accordance with a protocol, the protocol to be based on one of Institute of Electrical and Electronics Engineers (IEEE) 802.11, 802.16, Wireless Universal Serial Bus (USB) or Bluetooth.

7. The memory card reader of claim 6, further comprising a switching component to switch, in response to the status of the first memory card, from reading the first memory card to reading the second memory card.

8. The memory card reader of claim 6, wherein the status is to indicate one of a full memory card full, a completed download, a completed upload, a completed read or a completed write.

9. The memory card reader of claim 6, further comprising:
   an ejection mechanism for ejecting the first memory card in response to an event; and
   a loading mechanism for loading the second memory card into the slot in response to the ejection.

10. A memory card reader comprising:
    a housing defining a slot to receive a first memory card therein, and a memory card storage mechanism to store at least one second memory card therein, the storage mechanism comprising a second slot to receive the second memory card therein, the storage mechanism comprising a card ejector mechanism to facilitate removal of the second memory card from the second slot; and
    an electronic component to read the first memory card.

11. The memory card reader of claim 10, wherein the storage mechanism is defined by a recess formed in the housing, the recess being shaped and dimensioned to receive the second memory card therein.

12. The memory card reader of claim 10, wherein a part of the housing adjacent the recess is cut-away to define a gap into which a finger can be inserted to facilitate removal of the second memory card from the recess.

13. The memory card reader of claim 10, wherein the storage mechanism further comprises a memory card retaining mechanism to retain the second memory card in the slot therefor.

14. The memory card reader of claim 10, wherein the memory card storage mechanism stores at least two second memory cards.

15. A housing for a memory card reader, the housing comprising: a first slot to receive a first memory card therein while said memory card is being read by an electronic component; and
    at least one storage mechanism to store at least one second memory card therein, the storage mechanism to receive the second memory card therein, the storage mechanism further comprising a card ejector mechanism to facilitate removal of the second memory card from the second slot.

16. The housing of claim 15, wherein the storage mechanism is defined by a recess formed in the housing, the recess being shaped and dimensioned to receive the second memory card therein.

17. The housing of claim 15, wherein a part of the housing adjacent the recess is cut-away to define a gap within which at least a portion of a finger can be inserted to facilitate removal of the second memory card from the recess.

18. The housing of claim 15, wherein the storage mechanism further comprises a memory card retaining mechanism to retain the second memory card in the second slot.

19. The housing of claim 15, wherein the memory card storage mechanism stores at least two second memory cards.

* * * * *